US010362493B2

(12) United States Patent
Burgess et al.

(10) Patent No.: US 10,362,493 B2
(45) Date of Patent: Jul. 23, 2019

(54) HIGH-BANDWIDTH BEAMFORMING LTE BASE STATION

(71) Applicant: Legba, Inc., New York, NY (US)

(72) Inventors: David Burgess, Encinitas, CA (US); Diana Cionoiu, Encinitas, CA (US)

(73) Assignee: Legba, Inc., New York, NY (US)

( * ) Notice: Subject to any disclaimer, the term of this patent is extended or adjusted under 35 U.S.C. 154(b) by 126 days.

(21) Appl. No.: 15/383,028

(22) Filed: Dec. 19, 2016

(65) Prior Publication Data
US 2017/0181010 A1 Jun. 22, 2017

Related U.S. Application Data

(60) Provisional application No. 62/363,891, filed on Jul. 19, 2016, provisional application No. 62/268,597, filed on Dec. 17, 2015.

(51) Int. Cl.
*H04W 16/28* (2009.01)
*H04L 1/00* (2006.01)
(Continued)

(52) U.S. Cl.
CPC .......... *H04W 16/28* (2013.01); *H04B 7/0617* (2013.01); *H04B 7/0686* (2013.01);
(Continued)

(58) Field of Classification Search
CPC ...... H04B 7/043; H04B 7/0897; H04B 7/086; H04B 7/0686; H04B 7/0868; H04L 1/0027; H01Q 3/26
See application file for complete search history.

(56) References Cited

U.S. PATENT DOCUMENTS 5,115,248 A 5/1992 Roederer
6,871,049 B2 3/2005 Sugar et al.
(Continued)

OTHER PUBLICATIONS

International Search Report and Written Opinion in PCT/US2016/067612, dated Mar. 16, 2017, 14 pages.
(Continued)

*Primary Examiner* — Salvador E Rivas
(74) *Attorney, Agent, or Firm* — Craige Thompson; Thompson Patent Law; Vincent Musgrove

(57) ABSTRACT

Apparatus and associated methods relate to transmitting an independent data stream from a beamforming base station to a User Equipment receiver in a beam directed based on the User Equipment transmitter signal Angle of Arrival estimated as a function of separately demodulated and jointly decoded User Equipment transmitter signals received by at least two spatially separated base station antennas, and scheduling transmission to and from the User Equipment as a function of the Angle of Arrival. In an illustrative example, the beamforming base station may be an LTE base station. The User Equipment may be, for example, a user's smartphone accessing the Internet. The independent data stream may be transmitted to the smartphone in a beam directed to the location of the smartphone. Various examples may advantageously provide higher bandwidth, for example a concentrated beam directed to User Equipment may provide an independent data stream with the full radio bandwidth.

17 Claims, 13 Drawing Sheets

(51) Int. Cl.
*H04B 7/06* (2006.01)
*H04W 72/12* (2009.01)
*H01Q 3/26* (2006.01)
*H04W 72/04* (2009.01)

(52) U.S. Cl.
CPC ............ *H04L 1/0027* (2013.01); *H04W 72/12* (2013.01); *H04W 72/1268* (2013.01); *H01Q 3/26* (2013.01); *H04W 72/046* (2013.01)

(56) References Cited

U.S. PATENT DOCUMENTS

| | | | |
|---|---|---|---|
| 8,761,834 B2 | 6/2014 | Luz et al. | |
| 8,837,407 B2 | 9/2014 | Guo | |
| 9,008,222 B2 | 4/2015 | Stirling-Gallacher et al. | |
| 9,071,412 B2 | 6/2015 | Tiirola et al. | |
| 9,094,064 B2 | 7/2015 | Alex et al. | |
| 9,179,471 B2 | 11/2015 | Zhu et al. | |
| 9,241,333 B2 | 1/2016 | Sahlin et al. | |
| 9,252,893 B2 | 2/2016 | Liu et al. | |
| 9,264,913 B2 | 2/2016 | Tsukizawa et al. | |
| 9,337,969 B2 | 5/2016 | Raghavan et al. | |
| 9,413,474 B2 | 8/2016 | Chai et al. | |
| 9,445,282 B2 | 9/2016 | Chen et al. | |
| 2013/0070741 A1* | 3/2013 | Li | H04W 72/046 370/338 |
| 2014/0050280 A1* | 2/2014 | Stirling-Gallacher | H04B 7/0486 375/296 |
| 2016/0150435 A1* | 5/2016 | Baek | H04W 16/28 370/252 |

OTHER PUBLICATIONS

Second Written Opinion in PCT/US2016/067612, dated Dec. 20, 2017, 8 pages.

* cited by examiner

HIGH-BANDWIDTH BEAMFORMING LTE BASE STATION

CROSS-REFERENCE TO RELATED APPLICATIONS

This application claims the benefit of U.S. Provisional Application Ser. No. 62/363,891, first named inventor Diana Elena Cionoiu, filed by David Burgess on Jul. 19, 2016, and U.S. Provisional Application Ser. No. 62/268,597, first named inventor Diana Elena Cionoiu, filed by David Burgess on Dec. 17, 2015.

This application incorporates the entire contents of the foregoing application(s) herein by reference.

TECHNICAL FIELD

Various embodiments relate generally to beamforming in wireless networks.

BACKGROUND

Wireless networks are communication networks without wires. Wireless networking employs principles of computation and communication. Some wireless networks communicate without wires by sending and receiving radio frequency signals. Some wireless networks connect mobile devices to infrastructure resources or to other mobile devices. Users of wireless networks include individuals, organizations, electronic devices, and computer applications. Some mobile devices connect to wireless network base stations operated by organizations referred to as wireless network carriers. For example, a wireless network operated by a wireless network carrier may provide access to bank account information by connecting a banking customer's mobile device to the customer's bank account through a wireless network base station. In some scenarios, a mobile device connecting to a BS (Base Station) is referred to as the UE (User Equipment). In the case where the wireless network is based on LTE (Long Term Evolution) radio standard, the Base Station is specifically called an ENodeB (Evolved Node-B).

Mobile devices may move with their users over wide areas. Some users of mobile devices desire to use services requiring high data bandwidth. For example, multimedia and file sharing services may require greater data bandwidth than text-based services. Wireless network carriers compete to provide mobile device users with increased data bandwidth at reduced cost. Some carriers locate wireless network base stations in areas of higher wireless network user density. For example, more wireless network base stations are located in cities than in rural areas. The signals transmitted by some wireless network base stations may disperse the transmitted energy in a fixed pattern covering a wide area referred to as a sector. Dispersing transmitted energy over a such an area reduces the SNR (Signal to Noise Ratio) at the UE relative to the total power transmitted by the base station. Some wireless network base stations and User Equipment may interfere with each other. For example, a base station transmitting at one power level to a distant UE may cause radio frequency interference with another, nearby base station transmitting at another power level, or radio transmission from a UE served by one BS may interfere with transmissions from another UE served by a different BS. Radio frequency interference causes lower data bandwidth and service interruptions. Lower data bandwidth and service interruptions due to radio frequency interference continue to be a challenge to users served by some sector-oriented wireless base stations.

SUMMARY

Apparatus and associated methods relate to transmitting an independent data stream from a beamforming base station to a User Equipment receiver in a beam directed based on the User Equipment transmitter signal Angle of Arrival estimated as a function of separately demodulated and jointly decoded User Equipment transmitter signals received by at least two spatially separated base station antennas, and scheduling transmissions to and from User Equipment as a function of the Angle of Arrival. In an illustrative example, the beamforming base station may be an LTE base station. The User Equipment may be, for example, a user's smartphone accessing the Internet. The independent data stream may be transmitted to the smartphone in a beam directed to the location of the smartphone. Various examples may advantageously provide higher bandwidth, for example a concentrated beam directed to User Equipment may provide an independent data stream with the full radio bandwidth.

Apparatus and associated methods relate to transmitting an independent data stream from a beamforming base station to a User Equipment receiver in a beam directed based on the User Equipment transmitter signal Angle of Arrival estimated as a function of separately demodulated and jointly decoded User Equipment transmitter signals received by at least two spatially separated base station antennas, and scheduling transmission to and from User Equipment as a function of the Angle of Arrival. In an illustrative example, the beamforming base station may be an LTE base station. The User Equipment may be, for example, a user's smartphone accessing the Internet. The independent data stream may be transmitted to the smartphone in a beam directed to the location of the smartphone. Various examples may advantageously provide reduced interference, for example, a concentrated beam directed to User Equipment may reduce the noise level for other User Equipment outside the beam.

Apparatus and associated methods relate to transmitting an independent data stream from a beamforming base station to a User Equipment receiver in a beam directed based on the User Equipment transmitter signal Angle of Arrival estimated as a function of separately demodulated and jointly decoded User Equipment transmitter signals received by at least two spatially separated base station antennas, and scheduling transmissions to and from the User Equipment as a function of the Angle of Arrival. In an illustrative example, the beamforming base station may be an LTE base station. The User Equipment may be, for example, a user's smartphone accessing the Internet. The independent data stream may be transmitted to the smartphone in a beam directed to the location of the smartphone. Various examples may advantageously provide lower operating cost, for example the need for carrier radio planning may be reduced or eliminated by non-interfering concentrated beams directed to User Equipment.

Apparatus and associated methods relate to transmitting an independent data stream from a beamforming base station to a User Equipment receiver in a beam directed based on the User Equipment transmitter signal Angle of Arrival estimated as a function of separately demodulated and jointly decoded User Equipment transmitter signals received by at least two spatially separated base station antennas, and scheduling transmissions to and from the User Equipment as a function of the Angle of Arrival. In an illustrative example, the beamforming base station may be an LTE base station. The User Equipment may be, for example, a user's smartphone accessing the Internet. The independent data stream may be transmitted to the smartphone in a beam directed to the location of the smartphone. Various examples may advantageously provide modular expansion based on interconnecting additional beamforming units each delivering the full radio bandwidth to associated User Equipment.

Apparatus and associated methods relate to transmitting an independent data stream from a beamforming base station to a User Equipment receiver in a beam directed based on the User Equipment transmitter signal Angle of Arrival estimated as a function of separately demodulated and jointly decoded User Equipment transmitter signals received by at least two spatially separated base station antennas, and scheduling the transmissions to and from the User Equipment as a function of the Angle of Arrival. In an illustrative example, the beamforming base station may be an LTE base station. The User Equipment may be, for example, a user's smartphone accessing the Internet. The independent data stream may be transmitted to the smartphone in a beam directed to the location of the smartphone. Various examples may estimate angle of arrival for radio devices other than the UEs served by the basestation and use that angle of arrival information to minimize interference to and from the other devices.

Various embodiments may achieve one or more advantages. For example, some embodiments may improve data bandwidth delivered to User Equipment. This facilitation may be a result of transmitting an independent data stream to the User Equipment receiver in a concentrated beam directed based on the User Equipment transmitter signal Angle of Arrival. In some embodiments, radio frequency interference in wireless networks may be reduced by directing concentrated radio frequency beams to the User Equipment receiving an independent data stream. Such focused direction of radio frequency energy may improve the Signal to Noise Ratio for User Equipment in a mobile wireless network and increase data bandwidth with lower transmit power. Some embodiments may reduce the operating cost of wireless mobile networks. Such cost reduction may be a result of the reduction or elimination of the need for radio planning or continuous optimization in a network through the use of directed beams which do not interfere with other directed beams.

In some embodiments, the effort required by a wireless network operator to provision a wireless base station may be reduced. For example, a wireless network operator provisioning a beamforming wireless mobile base station may avoid initial radio planning associated with a sector-oriented base station. This facilitation may be a result of the beamforming base station's use of directed beams which do not interfere with other directed beams. Some embodiments may reduce the number of handovers relative to sector-oriented base stations. For example, a beamforming base station employing narrow beams directed to User Equipment may experience fewer handovers than a sector-oriented system configured to provide similar bandwidth with many narrow angle sector antennas. Some examples may reduce the total power consumed by a wireless base station while delivering higher data bandwidth to the User Equipment. Such transmit power effectiveness may be a result of directing concentrated beams to User Equipment from many smaller antennas and amplifiers. Some examples may be safer for operation near humans and meet regulatory radiation safety requirements for installation on inhabited buildings because of their lower overall levels of transmitted power. Some examples may be able to co-exist with other radio networks in the same geographic area and operating in the same frequencies.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 8:
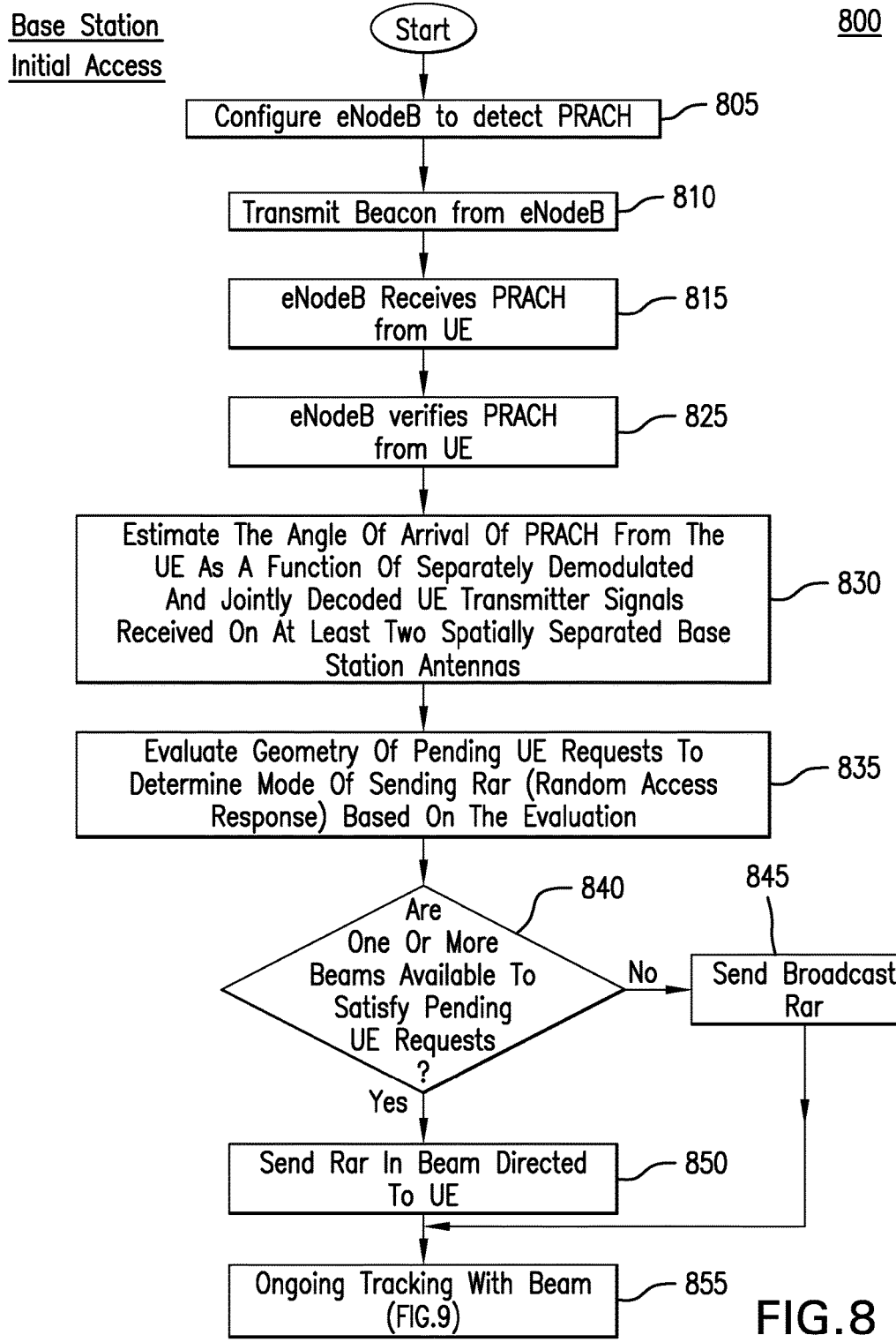
FIG. 8 depicts a process flow of an exemplary MAC Scheduler forming initial beams directed to User Equipment connecting to an exemplary beamforming base station.
Figure 9:
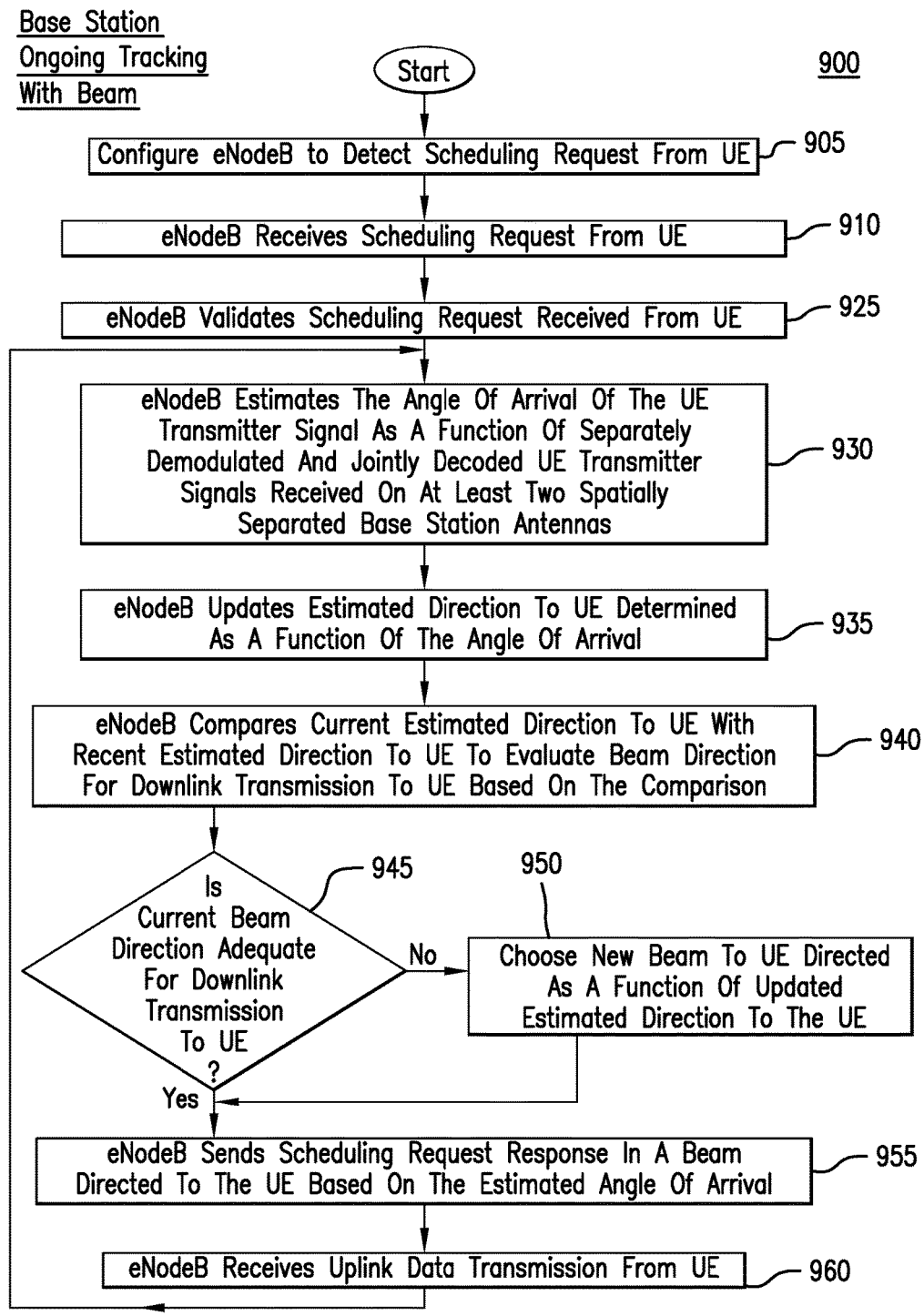
FIG. 9 depicts a process flow of an exemplary MAC Scheduler tracking moving User Equipment with directed beams.
Figure 10:
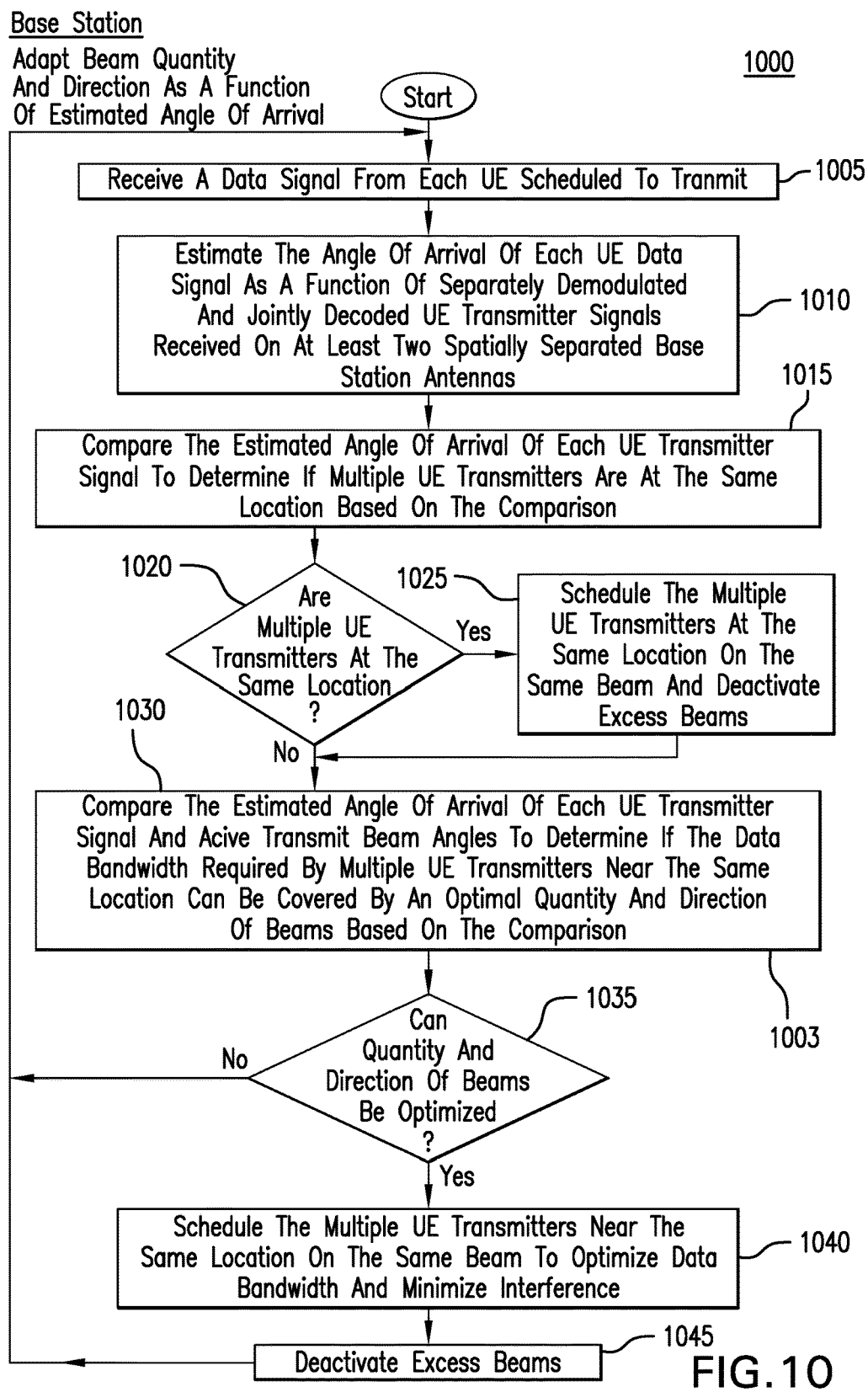
FIG. 10 depicts a process flow of an exemplary MAC Scheduler adapting transmit beam quantity and direction as a function of estimated angle of arrival.

To aid understanding, this document is organized as follows. First, transmitting an independent data stream from an exemplary beamforming base station to a User Equipment receiver in a beam directed based on the User Equipment transmitter signal Angle of Arrival estimated as a function of separately demodulated and jointly decoded User Equipment transmitter signals received by at least two spatially separated base station antennas, and scheduling the User Equipment transmitter as a function of the Angle of Arrival, are briefly introduced with reference to FIG. 1. Second, with reference to FIGS. 2-5, the discussion turns to exemplary embodiments that illustrate the structure and design of an exemplary beamforming base station. Specifically, an exemplary base station design, including illustrative examples of a Central Engine and antenna module, and exemplary processing stages for signals received by an exemplary base station, are disclosed. Then, the design and operation of exemplary beamforming transceiver and transmitter element driving channels are presented with reference to FIGS. 6A and 6B. Next, with reference to FIG. 7, radio performance data associated with an exemplary beamforming array is compared with the performance of an exemplary conventional sector system. Then, with reference to FIGS. 8-10, illustrative process flows of an exemplary MAC Scheduler are presented. Finally, with reference to FIG. 11, an illustrative example of an embodiment base station simultaneously scheduling multiple UE devices to use the same frequency resources based on the Angles of Arrival of the multiple UE signals at the base station is disclosed.

Figure 1:
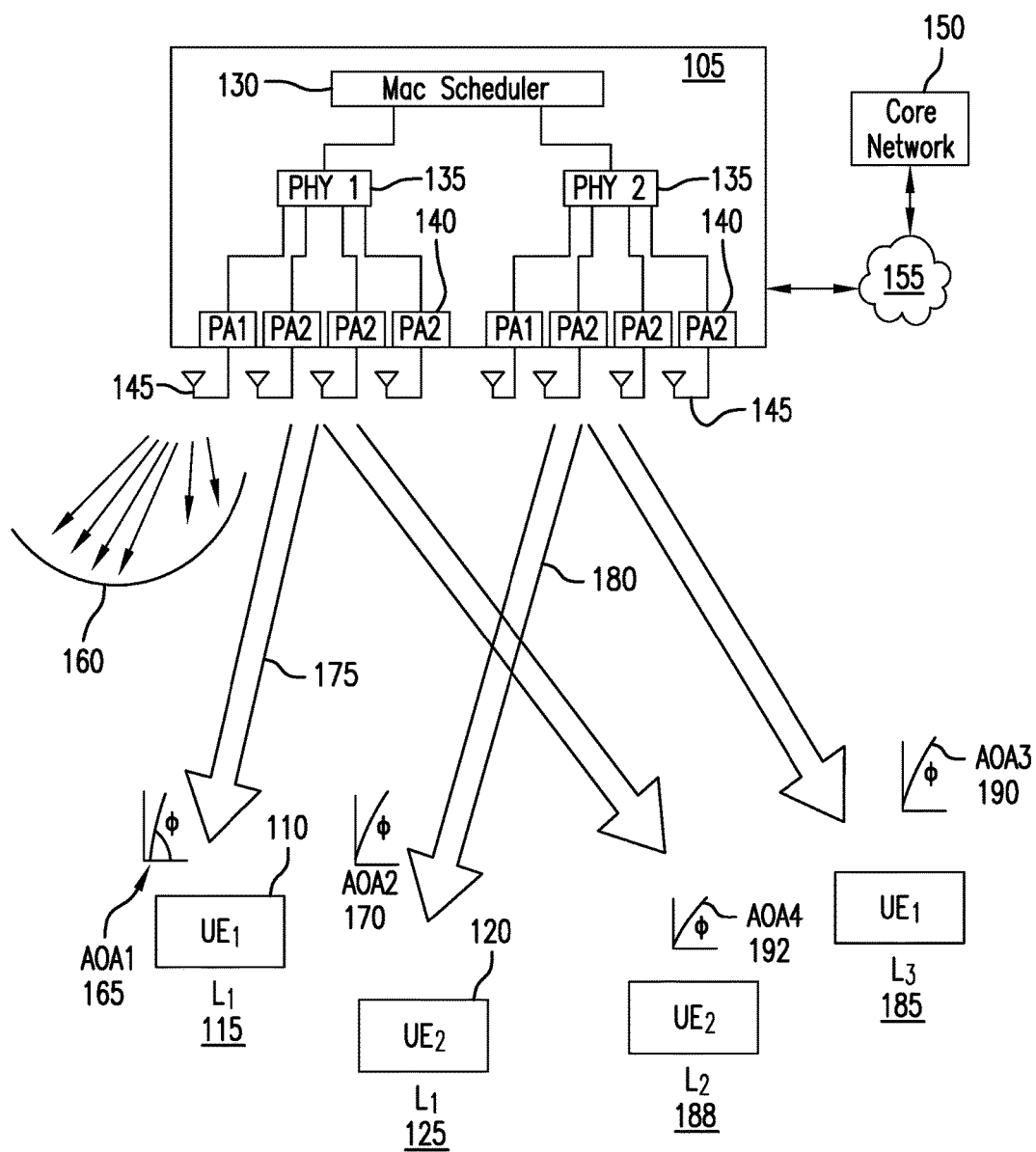
FIG. 1 depicts an exemplary base station transmitting an independent data stream from the beamforming base station to a User Equipment receiver in a beam directed based on the User Equipment transmitter signal Angle of Arrival estimated as a function of separately demodulated and jointly decoded User Equipment transmitter signals received by at least two spatially separated base station antennas, and scheduling the User Equipment transmitter as a function of the Angle of Arrival.

FIG. 1 depicts an exemplary base station transmitting an independent data stream from the beamforming base station to a User Equipment receiver in a beam directed based on the User Equipment transmitter signal Angle of Arrival estimated as a function of separately demodulated and jointly decoded User Equipment transmitter signals received by at least two spatially separated base station antennas, and scheduling transmissions to and from the User Equipment as a function of the Angle of Arrival. In FIG. 1, exemplary beamforming base station 105 provides a wireless network serving UE1 (User Equipment 1) 110 at location 115 and UE2 (User Equipment 2) 120 at location 125. In the depicted embodiment, the MAC Scheduler 130 controls the PHY (Physical Layer) 135, PA (Power Amplifier) 140, and Antenna 145 to connect UE1 110 and UE2 120 to the core network 150 through "backhaul" network 155. The MAC scheduler selects and controls the time and frequency resources used for transmissions to and from the UEs and also controls beam positions for transmissions to the UEs. In the illustrated embodiment, Power Amplifier 140 includes four power amplifiers individually controlled by the PHY 135. In the depicted embodiment, each Antenna 145 includes four or more antenna elements each driven directly by one of the four or more power amplifiers of the Power Amplifier 140. In an illustrative example, the beamforming base station 105 periodically transmits broadcast signal 160. In some embodiments, UE1 110 transmits a response to the broadcast signal 160. In an illustrative example, the response transmitted by UE1 110 arrives to the base station 105 at Angle of Arrival AoA1 165. In various implementations, UE2 120 transmits a response to the broadcast signal 160. In various scenarios, the response transmitted by UE2 120 arrives to the base station 105 at Angle of Arrival AoA2 170. In some designs, the base station 105 receives the response transmitted by the UE1 110 transmitter on at least two spatially separated base station antennas 145. In an illustrative example, the base station 105 separately demodulates and jointly decodes the UE1 110 response signals received on at least two spatially separated base station antennas 145 and estimates AoA 1 165 as a function of the separately demodulated and jointly decoded signals. In various embodiments, the MAC Scheduler 130 configures PHY1 135 to activate transmit beam 175 to UE1 110 at location L1 115 directed as a function of the UE1 110 transmitter signal Angle of Arrival AoA1 165, estimated as a function of the separately demodulated and jointly decoded UE1 110 transmitter signals received on at least two spatially separated base station antennas 145. In some embodiments, the MAC Scheduler 130 schedules the UE1 110 transmitter as a function of the estimated Angle of Arrival AoA1 165. In some embodiments, the base station 105 receives the response transmitted by the UE2 120 transmitter on at least two spatially separated base station antennas 145. In an illustrative example, the base station 105 separately demodulates and jointly decodes the UE2 120 response signals received on at least two spatially separated base station antennas 145 and estimates AoA 2 170 as a function of the separately demodulated and jointly decoded signals. In various embodiments, the MAC Scheduler 130 configures PHY2 135 to activate transmit beam 180 to UE1 120 at location L2 125 directed as a function of the estimated UE2 120 transmitter signal Angle of Arrival AoA2 170, estimated as a function of the separately demodulated and jointly decoded UE2 120 transmitter signals received on at least two spatially separated base station antennas 145. In some embodiments, the MAC Scheduler 130 schedules the UE2 120 transmitter as a function of the Angle of Arrival AoA2 170. In some scenarios, the UE1 110 moves from location L1 115 to location L3 185. In some scenarios, the UE2 120 moves from location L2 120 to location L4 188. In various designs, the UE1 110 transmitter signal arrives to the base station 105 at Angle of Arrival AoA3 190. In some examples, the UE2 120 transmitter signal arrives to the base station 105 at Angle of Arrival AoA4 192. In various embodiments, the base station 105 receives the UE1 110 and the UE2 120 transmitter signals on at least two spatially separated base station antennas 145. In an illustrative example, the base station 105 separately demodulates and jointly decodes the UE1 110 and UE2 120 transmitter signals received on at least two spatially separated base station antennas 145 and estimates AoA3 190 and AoA4 192 as a function of the separately demodulated and jointly decoded signals. In various implementations, the MAC Scheduler 130 determines if UE1 has moved based on a comparison of the Angle of Arrival AoA1 165 to the Angle of Arrival AoA3 190. In some designs, upon a determination the UE1 has moved, the MAC Scheduler 130 configures PHY1 135 to activate transmit beam 194 to UE1 110 at location L3 185 directed as a function of the UE1 110 transmitter signal Angle of Arrival AoA3 190, estimated as a function of the separately demodulated and jointly decoded UE1 110 transmitter signals received on at least two spatially separated base station antennas 145. In an illustrative example, the MAC Scheduler 130 may continuously estimate and update the Angle of Arrival of a UE transmitter signal, estimated as a function of separately demodulated and jointly decoded User Equipment transmitter signals received by at least two spatially separated base station antennas. In some embodiments, the MAC Scheduler 130 schedules the UE1 110 transmitter as a function of the estimated Angle of Arrival AoA3 190. In various implementations, the MAC Scheduler 130 determines if UE2 120 has moved based on a comparison of the estimated Angle of Arrival AoA2 170 to the estimated Angle of Arrival AoA4 192. In some designs, upon a determination the UE2 120 has moved, the MAC Scheduler 130 configures PHY1 135 to activate transmit beam 196 to UE2 120 at location L4 188 directed as a function of the estimated UE2 120 transmitter signal Angle of Arrival AoA4 192, estimated as a function of the separately demodulated and jointly decoded UE2 120 transmitter signals received on at least two spatially separated base station antennas 145. In some embodiments, the MAC Scheduler 130 schedules the UE2 120 transmitter as a function of the estimated Angle of Arrival AoA4 192. In various embodiments, Angle of Arrival may be estimated from signals received on two or more antennas and the signals from these antennas demodulated separately and jointly decoded based on a multiple soft-input turbo decoder. In various designs, the decoder may include a multiple soft-input convolutional decoder.

Figure 2A:
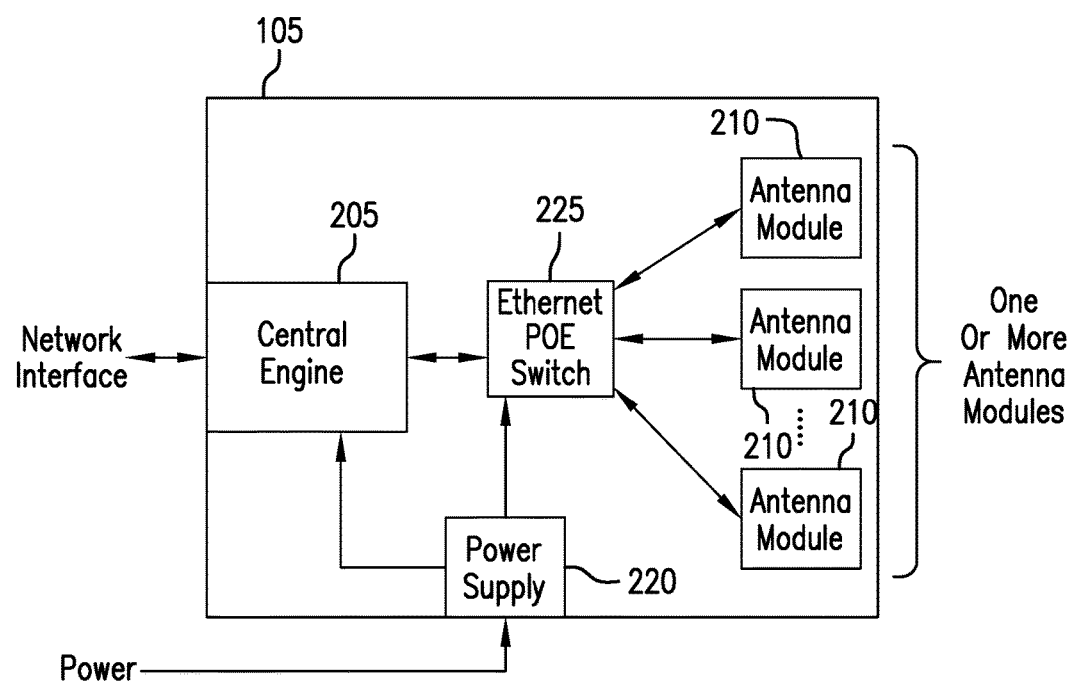
FIG. 2A depicts a structural overview of an exemplary beamforming base station.

FIG. 2A depicts a structural overview of an exemplary beamforming base station. In FIG. 2A, an exemplary beamforming eNodeB base station 105 includes Central Engine 205, and antennas modules 210 operably interconnected through and operably powered by power supply 220 through Ethernet switch 225. In various embodiments, the power via power supply 220 through Ethernet switch 225 may be POE (Power Over Ethernet). In various designs, the Central Engine 205 may be communicatively coupled to an external network.

Figure 2B:
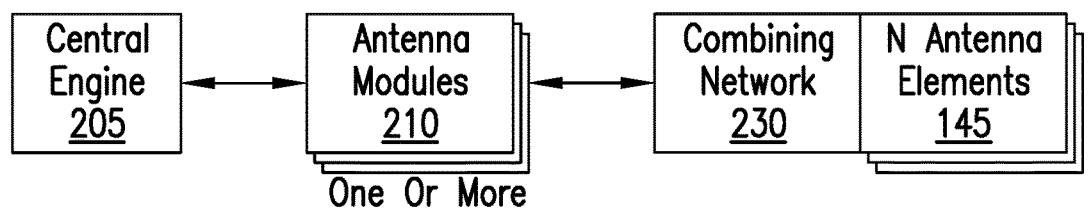
FIG. 2B depicts module relationships within an exemplary beamforming base station.

FIG. 2B depicts module relationships within an exemplary beamforming base station. The exemplary beamforming base station 105 depicted in FIG. 2B includes Central Engine 205, one or more antenna modules 210, one or more antenna arrays 145, and RF power combiners 230. In some embodiments, the Central Engine 205 may be adapted to implement the network interfaces and upper layers and MAC scheduler of the LTE radio access network. In an illustrative example, multiple transceiver modules 210 may be configured to implement lower PHY 135 and analog RF paths for receive and transmit for N antenna elements 145, and one or more antenna arrays of N elements with known geometry, driven through RF power combiners 230 as needed to allow multiple antenna modules 210 to share the same elements. The central engine 205 and antenna modules 210 may communicate through a backplane, bus or digital packet network. In some designs, the central engine 205 and transceiver modules 210 may communicate via Ethernet. In various embodiments, multiple antenna modules 210 may share a single antenna array 145 using RF power combining devices 230.

Figure 3:
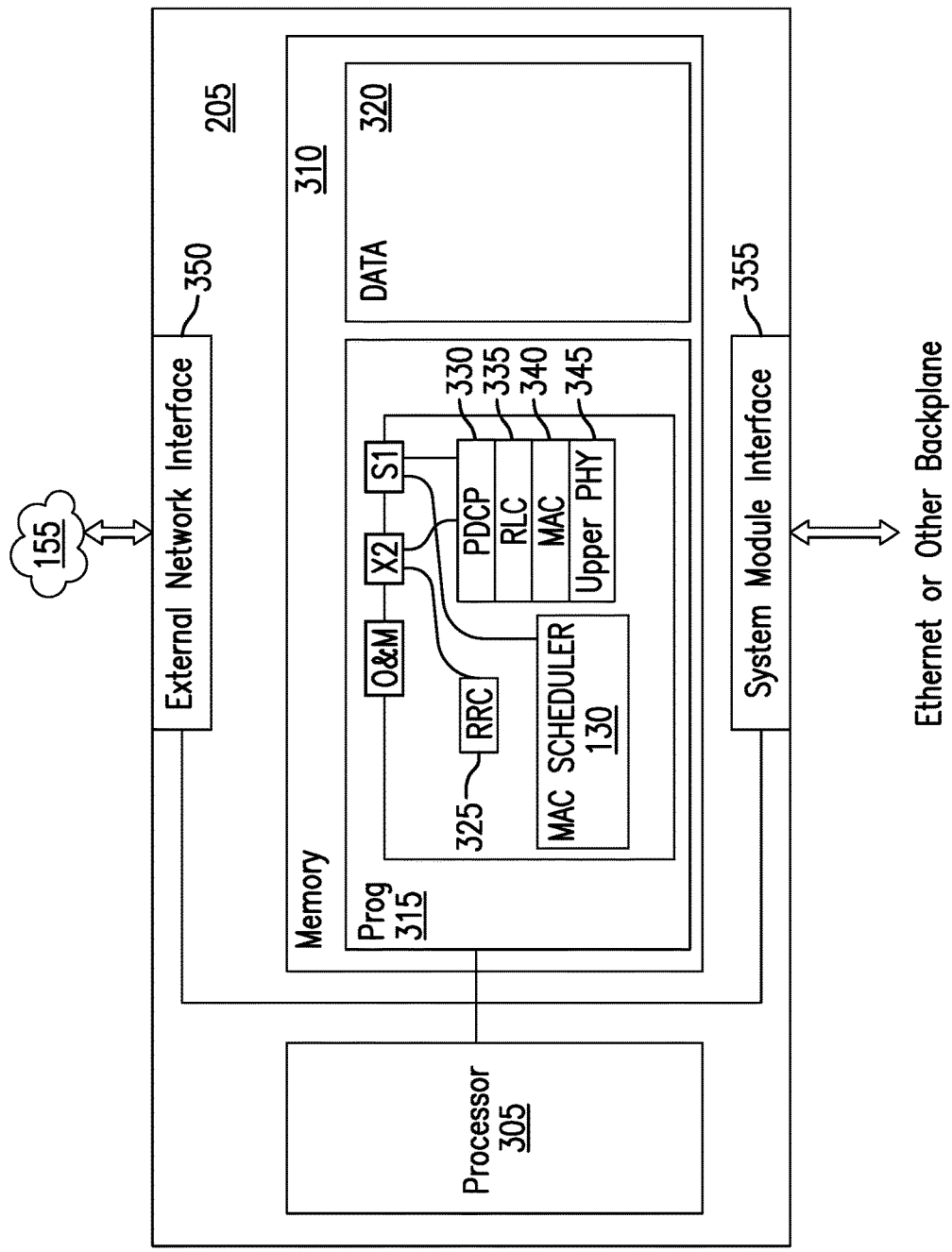
FIG. 3 depicts a structural view of an exemplary Central Engine.

FIG. 3 depicts a structural view of an exemplary Central Engine. In FIG. 3, a block diagram of an exemplary Central Engine 205 includes a processor 305 that is in electrical communication with memory 310. The depicted memory 310 includes program memory 315 and data memory 320. The program memory 315 includes processor-executable program instructions implementing RRC (Radio Resource Control) 325, PDCP (Packet Data Convergence Protocol) 330, RLC (Radio Link Control) 335, MAC (Media Access Control) multiplexing/demultiplexing 340, MAC scheduler 130, and upper PHY (transport and QAM mapping) 345. In an illustrative example, the program memory 315 also includes processor-executable program instructions implementing the network and O&M (operation and management) interfaces of the eNodeB, including S1, X2, KPI-related measurements, configuration, and control, in addition to implementing the upper layers of the LTE radio interface. In the depicted embodiment, the Central Engine 205 processor 305 is communicatively coupled to backhaul network 155 via external network interface 350. In the illustrated embodiment, the Central Engine 205 processor 305 is operably coupled to other modules in the beamforming base station 105 via system module interface 355.

Figure 4:
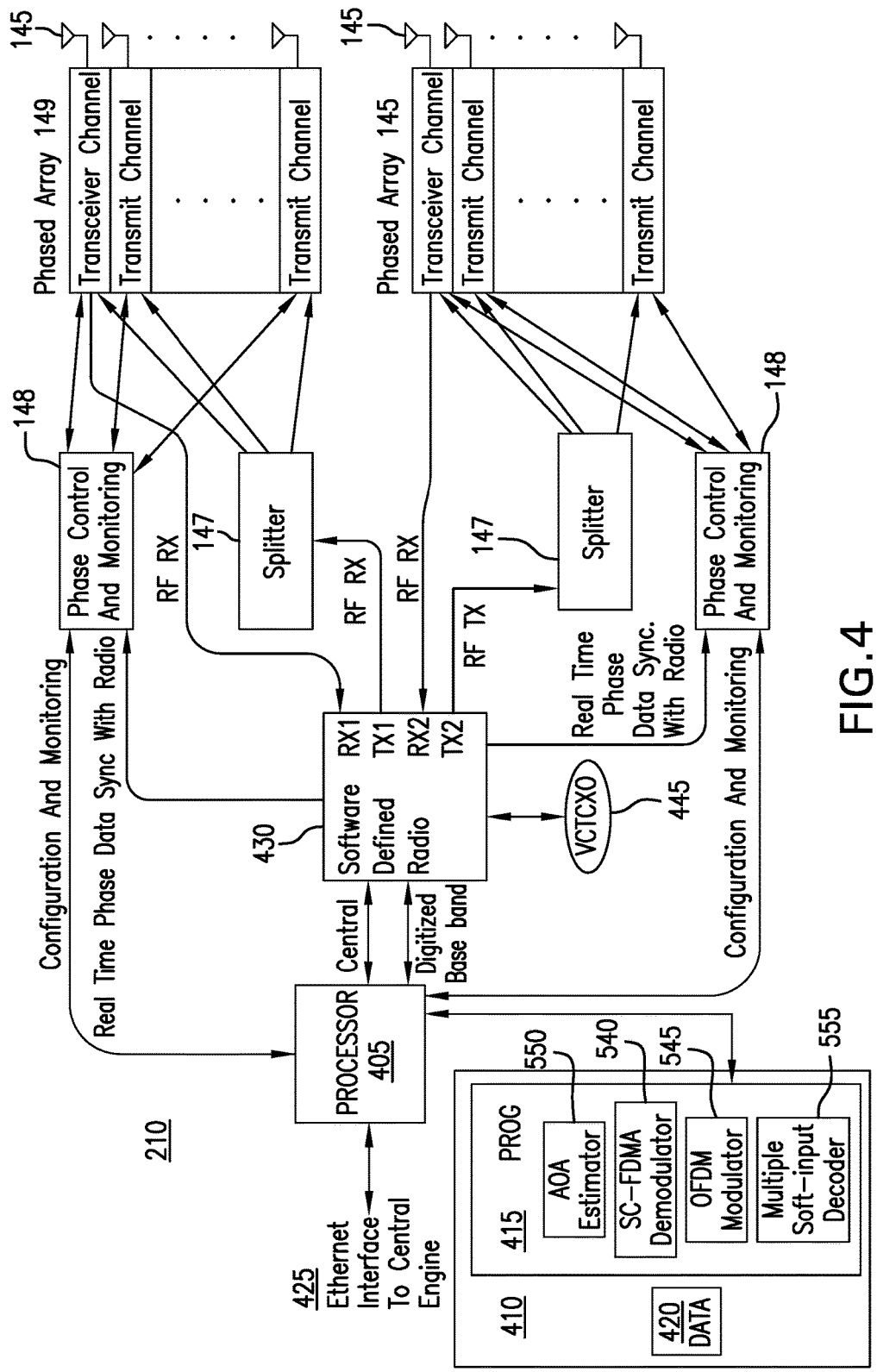
FIG. 4 depicts a structural view of an exemplary beamforming antenna module.

FIG. 4 depicts a structural view of an exemplary beamforming antenna module. In FIG. 4, a block diagram of an exemplary beamforming antenna module 210 includes processor 405 in electrical communication with memory 410. The depicted memory 410 includes program memory 415 and data memory 420. In an illustrative example, the program memory 415 may include processor-executable instructions implementing the uplink SC-FDMA baseband demodulator 540, AoA estimator for received signals 550, and the downlink OFDM baseband modulator 545. In various embodiments, the antenna module 210 may include a multiple-soft-input decoder 555, while in other embodiments the multiple-soft-input decoder may be in the central engine 205. In an illustrative example, including the multiple-soft-input decoder 555 in the central engine 205 may facilitate improved performance based on combining inputs from multiple antenna arrays. In some designs, including the multiple-soft-input decoder 555 in an antenna module 210 may facilitate improved scalability. In various embodiments, the uplink SC-FDMA baseband demodulator or the downlink OFDM baseband modulator may be implemented in another computing or hardware device such as a DSP or FPGA. In the depicted embodiment, the beamforming transceiver module 210 processor 405 is operably and communicatively coupled to the Central Engine 205 via Ethernet interface 425. In the depicted embodiment, the beamforming transceiver module 210 processor 405 is operably and communicatively coupled to software-defined radio 430. In an illustrative example, the software defined 430 may be a digital radio transceiver (mixed-signal front end, or MSFE) with two transmit channels and two receive channels. In the depicted embodiment, the Digital radio 430 receive path is coupled to the transceiver channel in the phase array 145. In the depicted embodiment, the Digital radio 430 transmit path is coupled to all of the four or more transmitter and/or transceiver channels in the phased array 149 via power splitter 147. In the depicted embodiment, the beamforming transceiver module 210 includes VCTCXO 445 disciplined by the processor 405 based on Ethernet signals from the central engine, via the control interface on the software defined radio 430. Because the array modules are coordinated at the MAC layer and have independent lower PHY layers, the array modules only require synchronization at the OFDM/SC-FDMA symbol level, not at the radio carrier level, simplifying the synchronization requirements from sub-nanosecond to 1-5 microseconds. In some embodiments, there may be only two beamforming transceiver channels in a beamforming eNodeB base station 105, with all other channels transmit-only. In the depicted embodiment, the phase arrays 145 are controlled and monitored by the computer 405 through phase control and monitoring units 148. Each of these units is also a small computer with its own program and data memory. The phase control and monitoring units also receive real-time beam control information from the software defined radio 430. The interfaces between the phase control and monitoring units 148 and the software defined radio 430 and processor 405 may be through synchronous peripheral interface (SPI).

Figure 5:
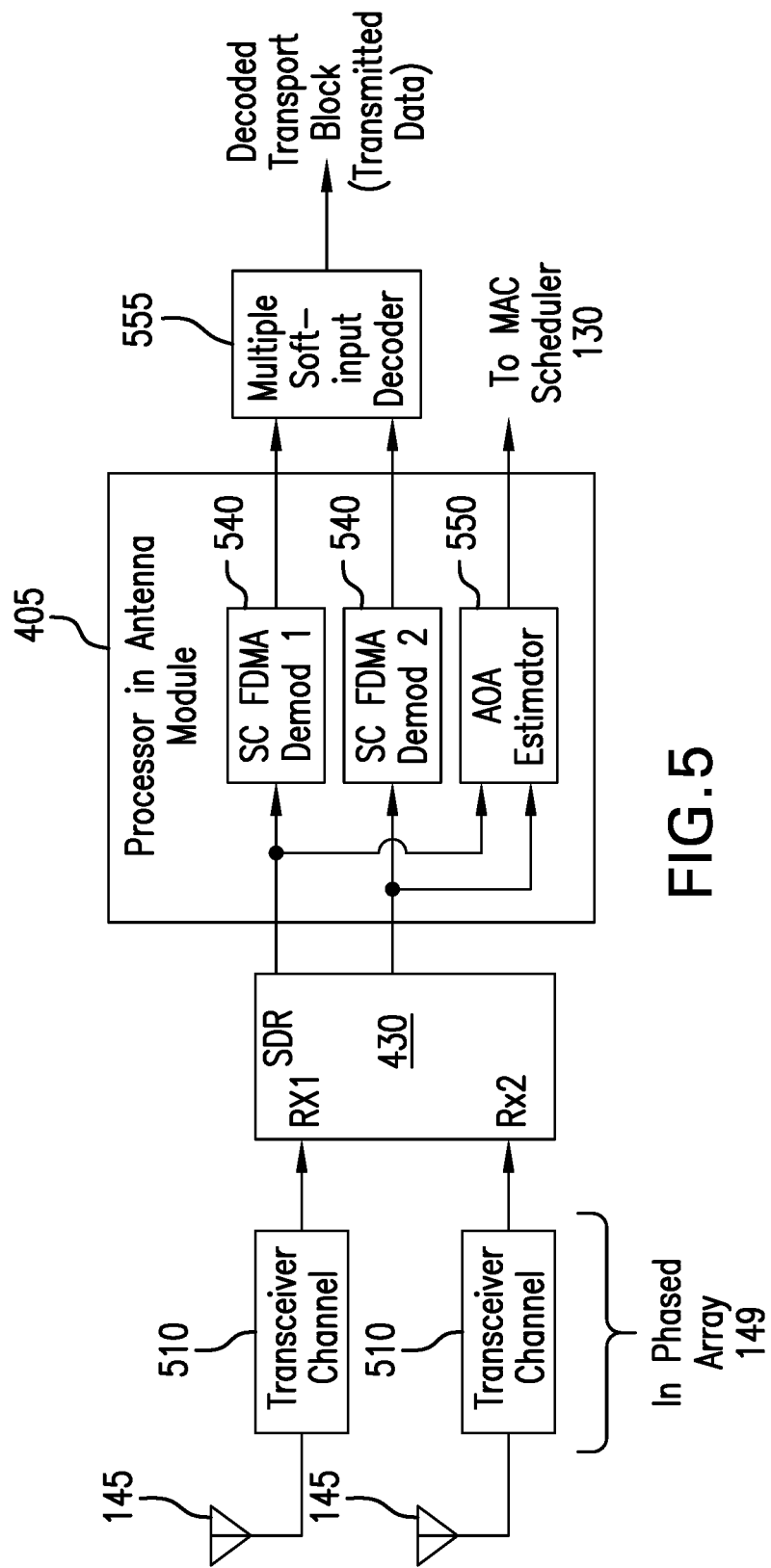
FIG. 5 Depicts the processing stages for received signals.

FIG. 5 depicts the processing stages for received signals. The signals arrive at the antennas 501 and are filtered and amplified by the transceiver channels 510 in the phase arrays. The signals are tuned and digitized by the software defined radio 430. The digital signal is processed by software in the processor 405, applying an SC-FDMA demodulator 540 independently to each received signal and applying an AoA estimator 550 to the two signals together. The two demodulated signals are then decoded into a "transport block" of transmitted data using a multiple soft-input decoder 555. This decoder can be in the processor 405 in the antenna module or in the processor 305 in the central engine 205, depending on the particular embodiment.

Figure 6A:
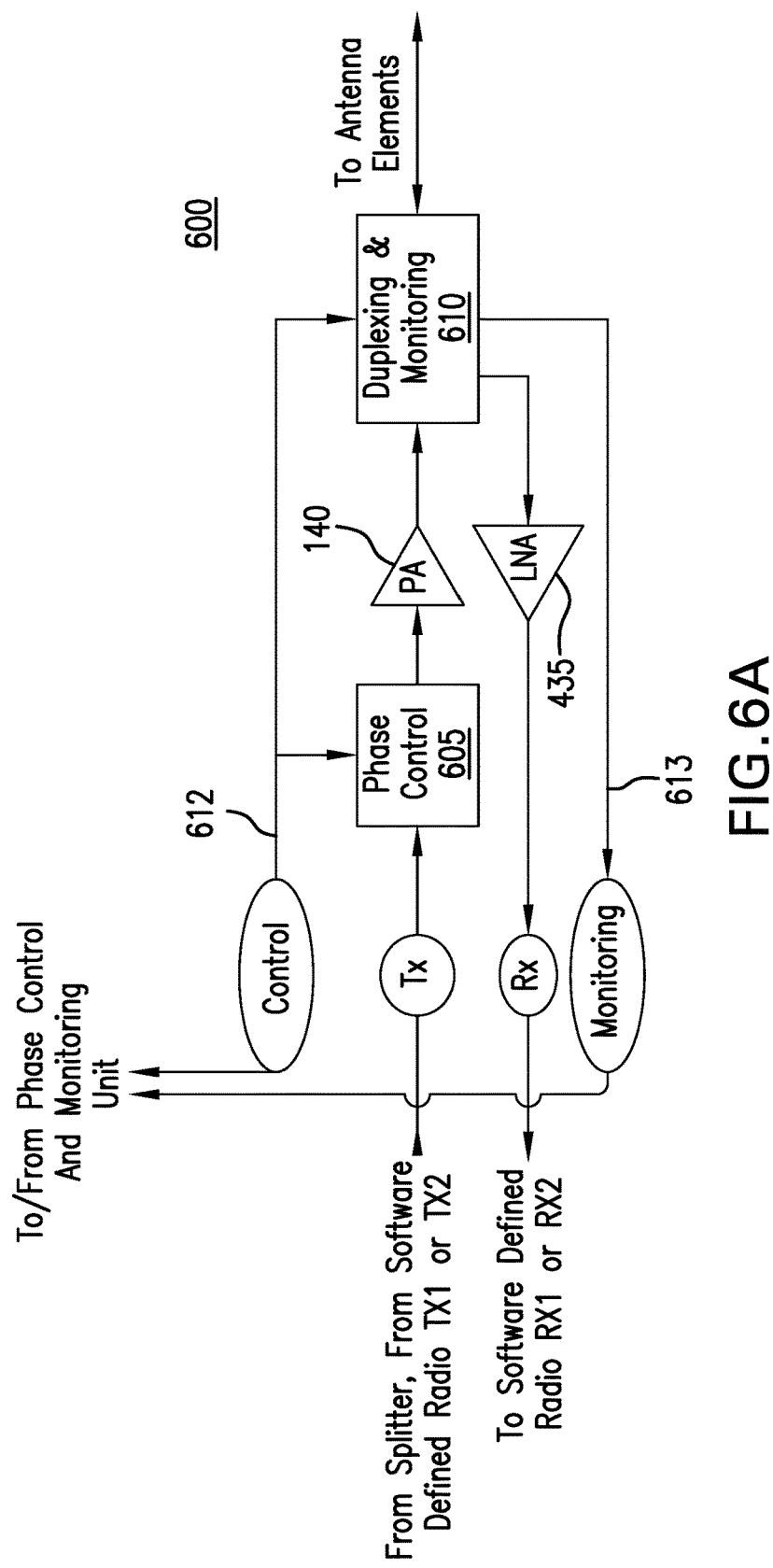
FIG. 6A depicts a structural view of an exemplary beamforming transceiver element driving channel.

FIG. 6A depicts a structural view of an exemplary beamforming transceiver element driving channel. In FIG. 6A, the depicted embodiment beamforming transceiver element driving channel is inside the phased array 149. In some embodiments, each transceiver module 210 may include an element driving channel associated with each of N antenna elements. The depicted exemplary element driving channel 600 includes phase control device 605, transmit power amplifier (PA) 140, receive low-noise amplifier (LNA) 435, and RF components for uplink/downlink duplexing and radio performance monitoring 610. In an illustrative example, transmit phase, output power, and the duplexing components may be configured via control interface 612 to a phase control and monitoring unit 148. In some embodiments, radio performance data and status may be retrieved via monitoring interface 613 to the phase control and monitoring unit 148. In various embodiments, the duplexing components 610 may be filter-based frequency duplexers, circulators, switches or some combination of these, depending on the LTE band. In some examples, multiple operating frequency bands may be supported by a single design with carefully selected parameters and components.

Figure 6B:
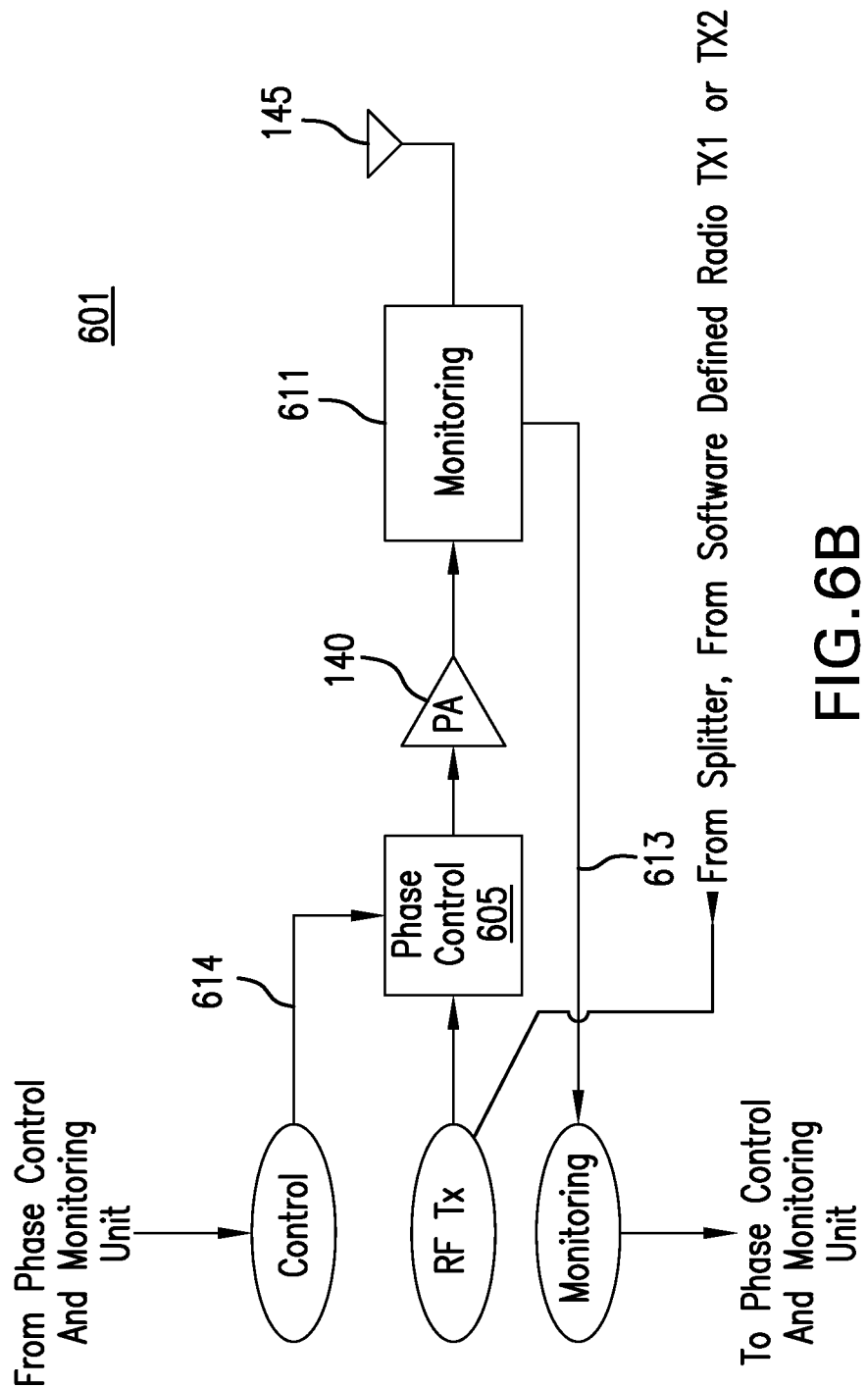
FIG. 6B depicts a structural view of an exemplary beamforming transmitter element driving channel.

FIG. 6B depicts a structural view of an exemplary beamforming transmitter element driving channel. The depicted embodiment beamforming transmitter element driving channel is inside the phased array 149. In some embodiments, each transmitter module 210 may include an element driving channel associated with each of N antenna elements. The depicted exemplary element driving channel 601 includes phase control device 605, transmit power amplifier (PA) 140, and RF components radio performance monitoring 611. In an illustrative example, transmit phase and output power may be configured via control interface 614 to the phase control and monitoring unit 148. In some embodiments, radio performance data and status may be retrieved via monitoring interface 613 to the phase control and monitoring unit 148. In some examples, multiple operating frequency bands may be supported by a single design with carefully selected parameters and components.

Figure 7:
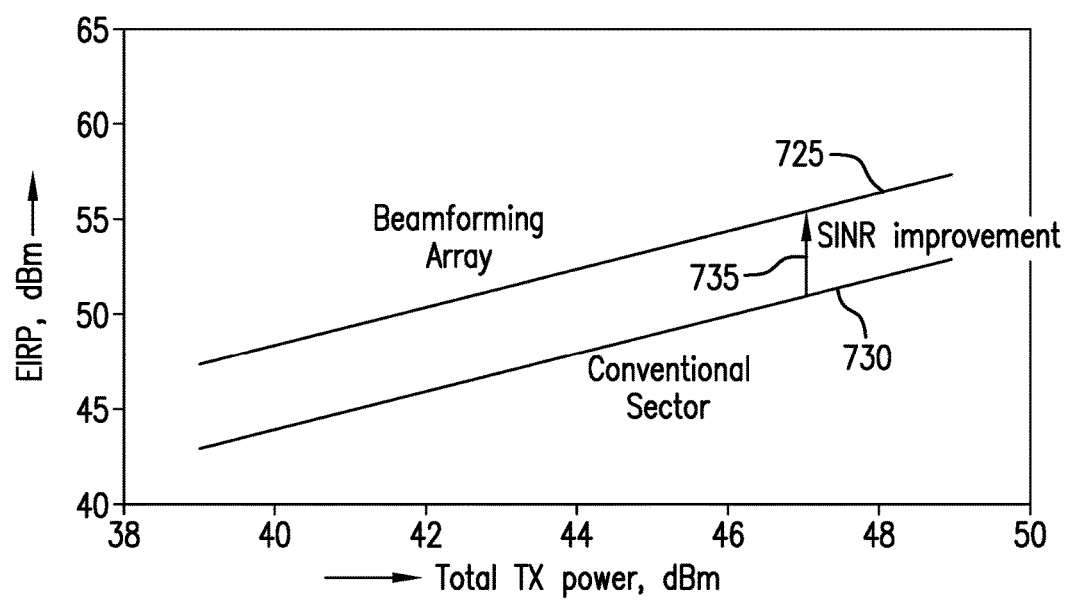
FIG. 7 depicts a graphical view of an exemplary reduction in average total transmitted power and corresponding improvement in SINR (Signal To Interference Plus Noise Ratio) based on an exemplary 8-element beamforming array module.

FIG. 7 depicts a graphical view of an exemplary reduction in average total transmitted power and corresponding improvement in SINR (Signal To Interference Plus Noise Ratio) based on an exemplary 8-element beamforming array module. In FIG. 7, the EIRP (Effective Isotropically Radiated Power) of an exemplary Beamforming array and an exemplary Conventional sector antenna are graphically compared, shown as functions of Total Transmitted Power. As depicted in FIG. 7, the Beamforming array Total Transmitted Power 725 is 9 dB lower than the Conventional sector antenna Total Transmitted Power 730 operating at the same EIRP as conventional eNodeB. This 9-dB reduction in average total transmitted power gives a corresponding reduction 735 of 9 dB in SINR (Signal to Interference Plus Noise Ratio). In the depicted example, the exemplary Beamforming array is an 8-element array; in some embodiments, larger beamforming arrays with more antenna elements per antenna module provide an even greater SINR improvement. In various designs, a 9-dB reduction in SINR corresponds to a 2×-3× improvement in range for every eNodeB in the system, or an improvement of about 3 bit/sec/Hz in data delivered to UEs at the existing cell edges.

FIG. 8 depicts a process flow of an exemplary MAC Scheduler forming initial beams directed to User Equipment connecting to an exemplary beamforming base station. The method depicted in FIG. 8 is given from the perspective of the MAC Scheduler 130 executing as program instructions on processor 305 in central engine 205 in the base station 105, depicted in FIG. 3. The depicted method 800 begins at step 805 with the processor 305 configuring transceiver channels 601 of the antenna modules 210 to receive the PRACH signal that a UE may send to initiate access to the network. The method continues at step 810 with the processor 305 configuring one of the transceiver channels 601 on one of the antenna modules 210 to send, periodically, the LTE beacon signal, consisting of the PSS, SSS and BCCH. In various scenarios, a UE transmits a PRACH signal to request access to the network. The method continues at step 815 with the processor 305 receiving a PRACH signal from a UE. The method continues at step 825 with the processor 305 verifying the PRACH signal sent by the UE in response to the beacon using independent demodulation and joint detection. The method continues at step 830 with the processor 305 estimating the Angle of Arrival of the PRACH signal received from the UE as a function of separately demodulated and jointly decoded UE transmitter signals received on at least two spatially separated base station antennas. The method continues at step 835 with the processor 305 evaluating the geometry of pending UE requests to determine the mode of sending RAR (Random Access Response) based on the evaluation. The method continues at step 840 with the processor 305 determining if one or more beams are available to satisfy pending UE requests, based on the geometry of pending UE requests evaluated by the processor 305 at step 835. In various scenarios, multiple UEs may send PRACH signals in the same subframe, effectively simultaneously. In some embodiments, the MAC scheduler 130 may choose to group its responses to allow UEs with similar Angle of Arrival to share a beam to receive RAR. In some designs, if there are many pending PRACH events, the MAC scheduler may choose to send the RAR in broadcast mode. Upon a determination one or more beams are not available to satisfy pending UE requests, the method continues at step 845 with the processor 305 sending RAR in broadcast mode, and the method continues at step 855 with the processor 305 executing ongoing UE tracking with beams directed to one or more UE. Upon a determination one or more beams are available to satisfy pending UE requests, the method continues at step 850 with the processor 305 sending RAR in a beam directed to one or more UE, based on the processor 305 scheduling frequency and beam position for the Random Access Response (RAR) based on UE signal Angle of Arrival estimated by the processor at step 830. The method continues at step 855 with the processor 305 executing ongoing UE tracking with beams directed to one or more UE.

FIG. 9 depicts a process flow of an exemplary MAC Scheduler directing beams to moving User Equipment. The method depicted in FIG. 9 is given from the perspective of the MAC Scheduler 130 executing as program instructions on processor 305 in central engine 205 in the base station 105, depicted in FIG. 3. The depicted method 900 begins at step 905 with the processor 305 configuring the eNodeB to detect a Scheduling Request (SR) data signal from a UE on the PUCCH (Physical Uplink Control Channel). The method continues at step 910 with the processor 305 receiving a Scheduling Request from a UE. The method continues at step 925 with the processor 305 validating the scheduling request based on processing the separately demodulated and jointly decoded UE PUCCH signals received on at least two spatially separated base station 105 antennas 145. The method continues at step 930 with the processor 305 estimating the current Angle of Arrival of the UE transmitter signal based on separately demodulated and jointly decoded UE signals received on at least two spatially separated base station 105 antennas 145. The method continues at step 935 with the processor 305 updating the estimated direction to the UE determined as a function of the estimated angle of arrival. The method continues at step 940 with the processor 305 comparing the current estimated direction to the UE with recently estimated direction to the UE to evaluate beam direction for downlink transmission to the UE based on the comparison. The method continues at step 945 with the processor 305 determining if the current beam direction to the UE is adequate for downlink transmission to the UE, based on comparison of the current estimated direction to the UE with recently estimated direction to the UE compared at step 940. In various embodiments, a determination the UE moved may be based on the comparison of past and current Angle of Arrival, and possibly averaging measurements to improve accuracy and in some embodiments reporting the PUCCH SR event and associated AOA to the MAC Scheduler 130. Upon a determination the current beam direction to the UE is not adequate for downlink transmission to the UE, the method continues at step 950 with the processor 305 choosing a new beam to the UE directed as a function of the updated estimated direction to the UE. Upon a determination the current beam direction to the UE is adequate for downlink transmission to the UE, the method continues at step 955 with the processor 305 sending a scheduling request response in a beam directed to the UE based on the estimated Angle of Arrival. In some embodiments, the MAC scheduler 130 sends an Uplink (UL) grant to the UE on the PDCCH, possibly using a directed beam based on the AOA estimate, if a beam is available. In various examples, the UE may receive a UL grant and use that grant to make an UL transmission on the PUSCH. In some designs, the processor 305 may again estimate the AOA of the received signal and update the estimate of the direction of the UE, and report this updated direction estimate to the MAC scheduler 130. In various embodiments, subsequent Downlink (DL) transmissions to a UE on the PDSCH (and their associated downlink allocations on the PDCCH) may be transmitted in a directed beam based on the direction estimate. The method continues at step 960, with the processor 305 receiving uplink data from a UE, and the method continues at step 930 with the processor 305 estimating the current Angle of Arrival of the UE transmitter signal based on separately demodulated and jointly decoded UE signals received on at least two spatially separated base station 105 antennas 145.

FIG. 10 depicts a process flow of an exemplary MAC Scheduler adapting transmit beam quantity and direction as a function of estimated angle of arrival. The method depicted in FIG. 10 is given from the perspective of the MAC Scheduler 130 executing as program instructions on processor 305 in central engine 205 in the base station 105, depicted in FIG. 3. The depicted method 1000 begins at step 1005 with the processor 305 receiving a data signal from each UE scheduled to transmit. The method continues at step 1010 with the processor 305 estimating the Angle of Arrival of each UE data signal as a function of separately demodulated and jointly decoded UE transmitter signals received by at least two spatially separated base station antennas. The method continues at step 1015 with the processor 305 comparing the estimated Angle of Arrival of each UE transmitter signal to determine if multiple UE transmitters are at the same location based on the comparison. At step 1020, the processor 305 determines if multiple UE transmitters are at the same location, based on the estimated Angle of Arrival of each UE transmitter signal compared at step 1015. Upon a determination by the processor 305 that multiple UE transmitters are at the same location, the method continues at step 1025 with the processor 305 scheduling the multiple UE transmitters at the same location on the same beam and deactivating excess beams. Upon a determination by the processor 305 that multiple UE transmitters are not at the same location, the method continues at step 1030 with the processor 305 comparing the estimated Angle of Arrival of each UE transmitter signal and active transmit beam angles to determine if the data bandwidth required by multiple UE transmitters near the same location can be covered by an optimal quantity and direction of beams based on the comparison. At step 1035, the processor 305 determines if the quantity and direction of beams can be optimized, based on the estimated Angle of Arrival of each UE transmitter signal and active transmit beam angles compared at step 1030. Upon a determination by the processor 305 the quantity and direction of beams cannot be optimized, the method continues at step 1005 with the processor 305 receiving a data signal from each UE scheduled to transmit. Upon a determination by the processor 305 the quantity and direction of beams can be optimized, the method continues at step 1040 with the processor 305 scheduling the multiple UE transmitters near the same location on the same beam to optimize bandwidth and minimize interference. The method continues at step 1045 with the processor 305 deactivating excess beams, and the method continues at step 1005 with the processor 305 receiving a data signal from each UE scheduled to transmit.

Figure 11:
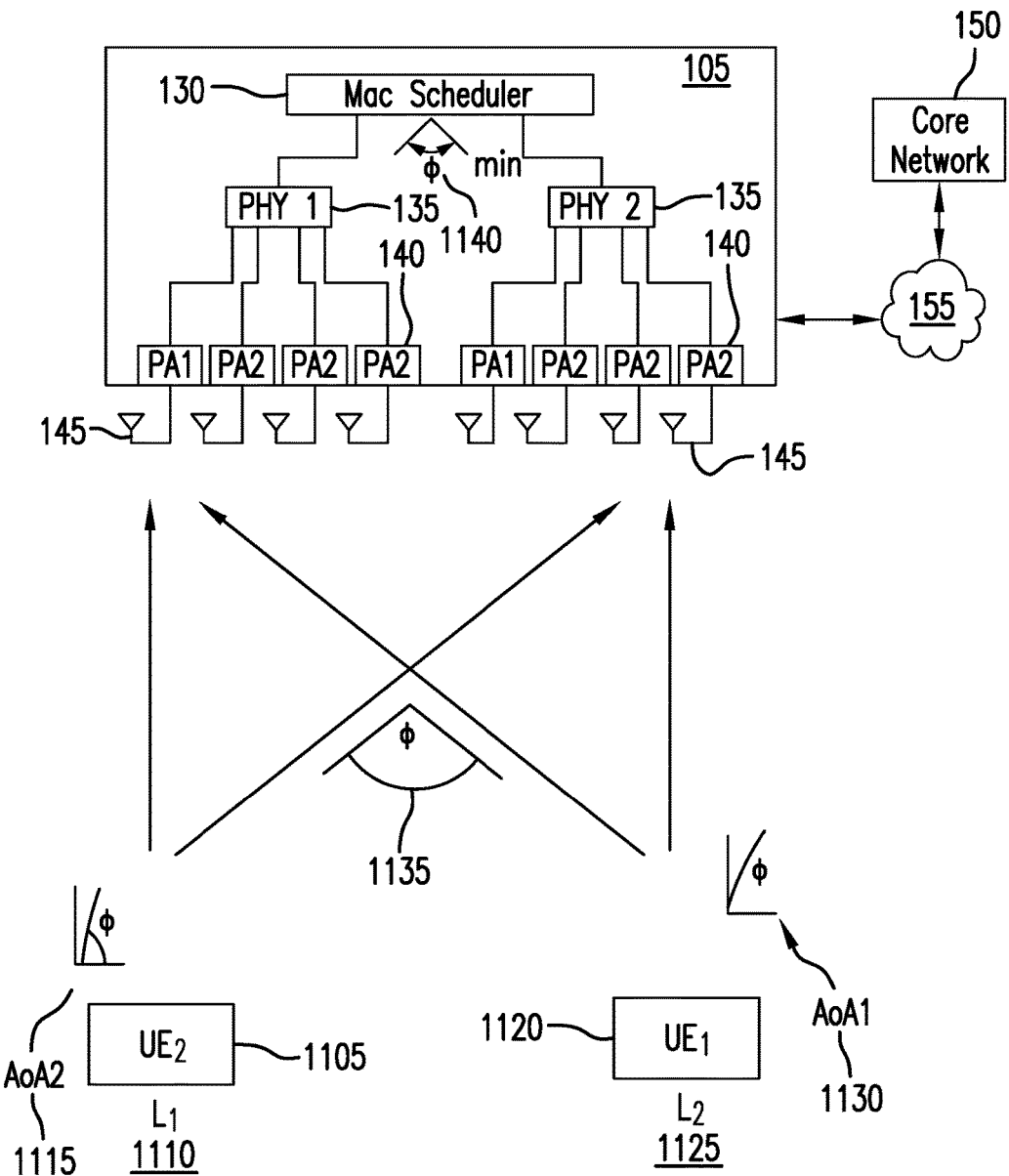
FIG. 11 depicts an exemplary base station simultaneously scheduling multiple User Equipment (UE) devices to use the same frequency resources, based on the multiple UE signals arriving to at least two spatially separated base station antennas at an angle greater than a predetermined minimum angle.

FIG. 11 depicts an exemplary base station simultaneously scheduling multiple User Equipment (UE) devices to use the same frequency resources, based on the multiple UE signals arriving to at least two spatially separated base station antennas at an angle greater than a predetermined minimum angle. In FIG. 11, UE2 1105 transmits to the base station 105 from location L1 1110. In the depicted example, the UE2 1105 transmitter signal arrives to the base station 105 antenna array 145 at Angle of Arrival AoA2 1115. UE1 1120 transmits to the base station 105 from location L2 1125. In the depicted example, the UE1 1120 transmitter signal arrives to the base station 105 antenna array 145 at Angle of Arrival AoA1 1130. In the depicted example, the UE1 1120 transmitter signal and the UE2 1105 transmitter signal arrive to the base station with differential Angle of Separation 1135 between UE1 1120 transmitter signal and the UE2 1105 transmitter signal. In the depicted example, the UE1 1120 transmitter signal and the UE2 1105 transmitter signal are received on at least two spatially separated base station 105 antennas. In the illustrated example, the Angle of Separation 1135 between UE1 1120 transmitter signal and the UE2 1105 transmitter signal at the base station 105 is greater than a predetermined Minimum Angle of Separation 1140. In the depicted embodiment, the MAC Scheduler 130 is aware of the Angle of Separation 1135 and the Minimum Angle of Separation 1140. In the illustrated example, the MAC Scheduler 130 may simultaneously schedule uplink of UE1 1120 and UE2 1105, based on the Angle of Separation 1135. In some embodiments, the MAC Scheduler 130 may simultaneously schedule multiple UE devices to use the same uplink frequency resources at the same time, as a function of the Angles of Arrival AoA1 1130, AoA2 1115, and the Angle of Separation 1135, determined as a function of the separately demodulated and jointly decoded UE transmitter signals received on at least two spatially separated base station antennas. In an illustrative example, a joint decoder 555 may decode multiple UE signals separately although the signals arrive on the same frequencies at the same time. In various examples, a joint decoder 555 may identify each UE signal, decoding and recovering each UE signal arriving from different Angles of Arrival AoA1 1130 and AoA2 1115, based on the phase differentiation of the signals at the physical layer. In some designs, the MAC Scheduler 130 may double up, or simultaneously schedule, uplink transmissions to share the same time and frequency resources with the constraint that the Angle of Separation 1135 between the UE signals is greater than predetermined Minimum Angle of Separation 1140. In an illustrative example, the Minimum Angle of Separation may be defined as one-hundred and eighty degrees divided by the number of receive antennas. For example, in an embodiment system having two receive antennas, an Angle of Separation 1135 of more than ninety degrees may be sufficient for the MAC Scheduler 130 to simultaneously schedule multiple UE devices to use the same frequency resources at the same time, as a function of Angles of Arrival and Angles of Separation. In various embodiments, the MAC Scheduler 130 may optimize uplink capacity by coalescing UEs into groups having larger angle spread, based on scheduling decisions determined as a function of Angles of Arrival and Angles of Separation.

Although various embodiments have been described with reference to the Figures, other embodiments are possible. For example, various designs may employ transmit beamforming of downlink Control Channels. For example, in addition to beamforming the main downlink data channels, Control Channels including PHICH, PFICH and PDCCH may also be transmitted using beamforming, a notable difference from the standard transmission modes 8 and 9 defined in the LTE specifications. In various designs, the content of the control channels to the UEs served by each beam maybe controlled and be different in each beam. In an illustrative example, uplink and downlink loss may not be symmetric because the receive path is very different from the transmit path. In various examples, these asymmetric transmit and receive paths and asymmetric losses may cause the UE to consistently transmit with too little power. In some designs, the power of the ENB reported in the beacon may be offset to report more power than the ENB is actually transmitting.

In an illustrative example, disclosed herein is a practical design for dramatically lowering the cost of large beamforming arrays. This cost reduction will allow beamforming arrays to come into widespread use in mobile communications networks, leading to large improvements in radio network performance and the ability for multiple network operators to share spectrum with little or no coordination.

Some wireless network carriers employ radio planning in an ongoing effort to reduce the radio frequency interference levels of sector-oriented wireless base stations. Radio planning includes adjusting the wide sector-oriented transmit signal patterns and power levels to reduce interference. Some radio planning techniques may trade reduced effectiveness of a transmitted signal for reduced interference levels. For example, the transmit power level, coverage area, or channel allocation of one sector-oriented wireless base station may be reduced to avoid interference with another sector-oriented wireless base station. In some scenarios, changing environmental factors impact the need for ongoing radio planning which may be referred to as Continuous Optimization. For example, a seasonal influx of some users to an area served by a sector-oriented wireless base station may render sub-optimal a previous radio planning effort. In addition, factors such as foliage growth or new construction can degrade the performance of a sector-oriented base-station to levels triggering the need for further radio planning. Radio planning remains a great cost of operating some wireless data networks served by sector-oriented wireless base stations.

Beamforming is a method for controlling the direction in which an array of radio antennas radiates power. Beamforming principles are well-known in the field of radio engineering. Generally speaking, using an array of N identical antennas will reduce the angle covered by a beam by a factor of N and increase the effective power of the transmission also by a factor of N. The principles of beamforming can be applied to LTE by controlling the relative phases of the RF carrier at each antenna element.

Because the transceiver and transmitter channels can control phases for each LTE sub frame, an LTE beamforming system can change the beam pattern every millisecond, depending on which handsets are being served. In an illustrative example, the LTE beamforming design disclosed herein is an all-software LTE eNodeB, where all signal processing functions may be implemented in software on a general purpose CPU, such as an Intel or ARM, without using DSP chips or FPGAs. Signal processing functions may be coded in a high-level language (C++) and run on a general-use operating system (Linux).

For beamforming to be practical in an eNodeB, the MAC scheduler must also take beamforming into account when scheduling radio resources. In various implementations, beam position is another scheduled resource, just like time, power and frequency. In some designs, the beamforming eNodeB may limit interference to other networks in the area by controlling the beam movement, the beam bandwidth and the beam power.

In various implementations, the beamforming base station does beamforming based on angle-of-arrival (AOA) estimates. In an illustrative example, received signals from different antenna elements may combined in a multiple soft-input decoder after demodulation and their relative phases are also calculated. In some embodiments, the receiver may estimate the angle of arrival of the signal on the horizontal and vertical axes from these relative phases and the known geometry of the array. In some embodiments, angle of arrival may be estimated using cross-correlation of signals from the different antennas. In some designs, because these estimates are taken as fast as every millisecond, much faster than the angular motion of the UE, they can be averaged over time to improve accuracy. In some designs, angle of arrival estimates from different antenna modules may be combined to improve accuracy. In various examples, nonlinear averaging techniques may also be used to improve accuracy against multipath. In some implementations, AOA estimates may then be used by the transmit modules to steer a beam toward a specific user.

The AOA approach allows a great simplification in the radio modules, since in various embodiments most of the modules may be transmit-only. The AOA approach also allows various designs of the eNodeB to perform beamforming in FDD modes, when the transmit and receive paths are not symmetric, but the direction from the array to the UE remains consistent. In some designs, beamforming may be combined with 2×2 MIMO or multi-user MIMO.

Some design considerations are cost and scalability to large arrays. In various embodiments, the beamforming design may use inexpensive stripline patch antennas, formed directly on a printed circuit board (PCB). In some examples, each antenna module (described below) may be a single PCB, carrying antennas, amplifiers and phase shifting components. In various implementations, a beamforming design may be based on commodity radio components of similar type to those which may be used in mobile handsets and femtocells. In some designs, the computing components may be general-purpose CPUs using an Intel x86 or ARM architecture. In various examples, the "backplane" of the radio array may be Ethernet. In an illustrative example, signal processing functions of the beamformer may be implemented in software in a high level language (C++).

In various designs, the overall organization of the beamforming eNodeB may be made from two types of modules: a "central engine" that implements the network interfaces and upper layers of the LTE stack and the MAC scheduler, and an antenna module that implements two or more transceiver channels and six or more transmit-only channels.

In some embodiments, the central engine may implement the network and management interfaces of the eNodeB (S1, X2, KPI-related measurements, configuration control, etc.) In some designs, the central engine may also implement the upper layers of the LTE radio interface: PDCP (Packet Data Convergence Protocol), RLC (Radio Link Control), RRC (Radio Resource Control), MAC (Media Access Control) multiplexing/demultiplexing, MAC scheduling and PHY transport encoding and QAM mapping.

In some embodiments, the transceiver module may also include a CPU that is used to run the uplink SCFDMA demodulator and the downlink OFDM modulator for broadcast channels. In some designs, radio synchronization may be achieved using Ethernet.

In some designs, an eNodeB may contain any number of antenna modules, arranged according to the needs of a specific installation site. In various implementations, each antenna module may include eight or more stripline patch antennas with a wideband digital transmitter and a power amplifier for each antenna. In some embodiments, each antenna module may also include a CPU that may be used to implement the downlink OFDM modulator, AoA estimator, uplink SC-FDMA demodulator and multiple soft-input decoder for this set of antennas. In various implementations, the patch antenna size may be roughly one-half wavelength and the patch spacing may be one wavelength, giving a square module with overall dimensions of two wavelengths by four wavelengths. In an illustrative example, these units may be combined in any geometry to match a specific application, with each module providing an independent beam carrying the full radio bandwidth of the basestation. In some designs, the overall power consumption of each antenna module is less than 30 Watts to allow power distribution over the Ethernet network cabling (PoE).

In an illustrative example, we consider the operation of a standalone eNodeB and the advantages of various embodiments of a beamforming design, beginning with Transmitted power vs. EIRP. In some examples, a key aspect of a modular array is that EIRP in the main beam increases with the square of the number of transmit channels in the antenna module. This is because both actual transmit power and array gain increase linearly. In various examples this resulting difference in actual transmit power has several practical implications for the operation of the eNodeB: In some designs, the beamforming system may be safer for installation in occupied structures, since the transmit power levels from each element are low. In various embodiments, given a conservative front-back ratio of more than 15 dB for the antenna elements, the RMS EIRP on a back side of the array may not exceed 20 dBm (100 mW) at any point, making it safe for installation on the exterior walls of any building.

In various examples, a 9-dB reduction in power of an 8-element antenna module is a factor of 8 reduction in the electrical power needed to operate the amplifiers, meaning that the power demand related to amplifiers may be effectively eliminated in the beamforming base station. In an illustrative example, although power cost may not be a dominating consideration in urban areas, it may be a critical factor for operation in areas not served by a power grid. In some examples, a 9-dB reduction in power is a factor of 8 reduction in the amount of heat that must be dissipated by the array, which may greatly simplify the mechanical design. In various embodiments, each antenna module in the beamforming base station may support the same downlink data rate as a full 2×2 MIMO eNodeB, about 160 Mbit/sec for a 20 MHz release 12 eNodeB.

In an illustrative example, operation of an embodiment beamforming eNodeB in a multi-cell network is now described. In various examples, LTE is normally operated as a single-frequency network, where network performance may be limited not by thermal noise but by interference from neighboring cells ("signal to interference plus noise ratio", SINR). In an illustrative example, it should be expected that a shared-spectrum environment will also be limited by SINR instead of SNR, since interference from other operators will normally exceed thermal noise. In various examples, high array gains result in lower SINR in the radio environment, because there may be less total power transmitted from each radio. For example, for the 8-element antenna module in the previous example, total transmitted power is 9 dB lower than for a conventional eNodeB operating at the same EIRP. In an illustrative example, this 9-dB reduction in average total transmitted power gives a corresponding reduction of 9 dB in SINR. In some designs, the improvement may be even greater for larger arrays.

In various embodiments, a 9-dB reduction in SINR may correspond to a 2×-3× improvement in range for every eNodeB in the system, or an improvement of 3 bit/sec/Hz in data delivered to UEs at the existing cell edges. In various examples, there may be occasional beam collisions resulting in instances of low SINR, but these will be brief and distributed randomly in time and frequency, and so may be tolerated with ARQ and HARQ in the higher layers of the protocol.

Some example results presented herein show that the interference risk to other LTE networks is small. In various scenarios, some radio technologies used in unlicensed bands use a "listen-before-talk" (LBT) protocol, also called "carrier sense multiple access" (CSMA) or "Aloha" (for historical reasons). In some examples, these protocols are inefficient and very sensitive to interference, but are widely deployed and enjoy popularity and political protection. For example, one of the most widely deployed LBT technologies is 802.11 WiFi, but there are others as well, such as Bluetooth and ZigBee. In an illustrative example, the results of testing show that LTE and WiFi networks can coexist in the same band if the duty cycle of the LTE signal, as seen by the WiFi network, can be kept at or below 20%. For example, this does not mean that the eNodeB needs to operate at an overall reduced duty cycle, only that the beam placement be controlled to limit the duty cycle seen by the WiFi network. In some designs, LTE may be highly tolerant of interference, having the ability to monitor SINR levels across its entire band in real time and the ability to change coding rates and frequency use based on those measurements every millisecond. The same AoA approach that is used to direct beams to UEs may also be used to detect the angles of WiFi devices relative to the array so that transmissions in those beam positions can be limited in power or in duty cycle.

In various embodiments, at least one User Equipment (UE) device may be scheduled by a radio-frequency base station based on: configuring the base station to determine a decoded UE signal data package based on separately demodulating and jointly decoding UE transmitter signals received on at least two spatially separated base station antennas; estimating an angle of arrival of the UE transmitter signals at the base station antennas as a function of the UE signal data package; determining a differential angle of separation between at least two UEs based upon the respective estimated angles of arrival for each of the at least two UEs; comparing the determined differential angle of separation to a predetermined minimum angle of separation determined as a function of the number of base station antennas configured to receive a UE transmitter signal; selecting a subset of the UEs for which the differential angle of separation exceeds the predetermined minimum angle of separation; generating scheduling instructions configured to direct each of the selected subset of UEs to simultaneously uplink to the base station on the same frequency; transmitting the scheduling instructions to the selected subset of UEs; and, activating at least one independent data stream to at least one of the selected subset of UEs transmitted in one or more beam directed as a function of the estimated angle of arrival at the base station antennas of at least one UE transmitter signal.

In some designs, determining a differential angle of separation between at least two UEs based upon the respective estimated angles of arrival for each of the at least two UEs may include simultaneously receiving the at least two UE signals on the same frequency on at least two spatially separated base station antennas.

In some embodiments, the receive antenna may be the same as the transmit antenna.

In various implementations, the UE transmitter signals received by the base station may include a radio signal in accordance with an LTE standard.

In some examples, the beam directed by the base station as a function of the estimated angle of arrival at the base station antennas may include a radio signal in accordance with an LTE standard.

In some designs, jointly decoding UE transmitter signals received on at least two spatially separated base station antennas may include jointly decoding multiple UE signals arriving simultaneously on the same frequency, based on phase differentiation of the signals at the physical layer.

In various embodiments, jointly decoding UE transmitter signals received on at least two spatially separated base station antennas may include jointly decoding the separately demodulated components of the decoded signal data package based on a multiple-soft-input turbo decoder.

In an illustrative example, jointly decoding UE transmitter signals received on at least two spatially separated base station antennas may include jointly decoding the separately demodulated components of the decoded signal data package based on a multiple-soft-input convolutional decoder.

In various embodiments, activating at least one independent data stream to at least one of the selected subset of UEs may include scheduling to send data to more than one UE in the same beam angle.

In some examples, at least one User Equipment (UE) device may be scheduled by a radio-frequency base station based on: configuring the base station to determine a decoded UE signal data package based on separately demodulating and jointly decoding UE transmitter signals received on at least two spatially separated base station antennas; estimating an angle of arrival of the UE transmitter signals at the base station antennas as a function of the UE signal data package; determining a differential angle of separation between at least two UEs based upon the respective estimated angles of arrival for each of the at least two UEs; comparing the determined differential angle of separation to a predetermined maximum angle of separation determined as a function of the number of base station antennas configured to receive a UE transmitter signal; selecting a subset of the UEs for which the differential angle of separation is less than or equal to the predetermined maximum angle of separation; generating a UE uplink schedule for at least one of the selected subset of UEs determined as a function of the estimated angle of arrival of the UE transmitter signals and the geometry of pending UE scheduling requests for the selected subset of UEs; generating scheduling instructions configured to direct each of the at least one of the selected subset of UEs to uplink to the base station in accordance with the UE uplink schedule; transmitting the scheduling instructions to the selected subset of UEs; and, activating at least one independent data stream to at least one of the selected subset of UEs transmitted in one or more beam directed as a function of the estimated angle of arrival at the base station antennas of at least one UE transmitter signal.

In some embodiments, activating at least one independent data stream to at least one of the selected subset of UEs may include scheduling to send data to more than one UE in the same beam angle.

In some examples, at least one User Equipment (UE) device may be scheduled by a radio-frequency base station based on: configuring the base station to periodically transmit a beacon signal and receive a response to the beacon signal from at least one UE; receiving at least one UE response to the beacon signal on at least two spatially separated base station antennas; configuring the base station to determine a decoded UE signal data package based on separately demodulating and jointly decoding UE transmitter signals received on the at least two spatially separated base station antennas; estimating an angle of arrival of the UE transmitter signals at the base station antennas as a function of the UE signal data package; determining a differential angle of separation between at least two UEs based upon the respective estimated angles of arrival for each of the at least two UEs; comparing the determined differential angle of separation to a predetermined minimum angle of separation determined as a function of the number of base station antennas configured to receive a UE transmitter signal; comparing the determined differential angle of separation to a predetermined maximum angle of separation determined as a function of the number of base station antennas configured to receive a UE transmitter signal; selecting a first subset of the UEs for which the differential angle of separation exceeds the predetermined minimum angle of separation; selecting a second subset of UEs for which the differential angle of separation is less than or equal to the predetermined maximum angle of separation; generating a first set of scheduling instructions configured to direct each of the selected first subset of UEs to simultaneously uplink to the base station on the same frequency; transmitting the first set of scheduling instructions to the selected first subset of UEs; generating a UE uplink schedule for at least one of the selected second subset of UEs determined as a function of the estimated angle of arrival of the UE transmitter signals and the geometry of pending UE scheduling requests for the selected second subset of UEs; generating a second set of scheduling instructions configured to direct each of the at least one of the selected second subset of UEs to uplink to the base station in accordance with the UE uplink schedule; transmitting the second set of scheduling instructions to the selected second subset of UEs; and, activating at least one independent data stream to at least one UE in the selected first and second subsets of UEs, the at least one independent data stream transmitted in one or more beam directed as a function of the estimated angle of arrival at the base station antennas of at least one UE transmitter signal.

In various embodiments, the transmit beam to the UE directed as a function of the estimated angle of arrival may include an LTE control channel.

In some embodiments, the base station may be expandable based on composing the base station with interconnected modules. In some designs the base station capacity or bandwidth may be expanded based on interconnecting additional modules to a functional base station. In various implementations, synchronization between the interconnected modules may be based on Ethernet. In some designs, radio synchronization between the interconnected modules may be achieved only through Ethernet.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the first receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using Omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Fire wire, ATA/IDE, RS-232, RS-422, RS-485, 802.11a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A method to schedule User Equipment (UE) by a radio-frequency base station, the method comprising:
   for each UE in a plurality of UEs:
   configuring a base station to decode a UE signal data package based on separately demodulating and jointly decoding a UE transmitter signal transmitted by the UE and received on at least two spatially separated base station antennas; and, estimating an angle of arrival of the UE transmitter signal at the spatially separated base station antennas as a function of the UE signal data package, determining a differential angle of separation between at least two of the plurality of UEs based upon the respective estimated angles of arrival of the UE transmitter signals for each of the at least two of the plurality of UEs;

comparing the determined differential angle of separation to a predetermined minimum angle of separation determined as a function of the number of spatially separated base station antennas;

selecting a subset of the plurality of UEs for which the differential angle of separation exceeds the predetermined minimum angle of separation;

generating scheduling instructions configured to direct the selected subset of the plurality of UEs to simultaneously uplink to the base station on a same frequency;

transmitting the generated scheduling instructions from the base station to each UE in the selected subset of the plurality of UEs using a beam directed to each UE in the selected subset of the plurality of UEs; and, activating an independent data downlink stream to a first UE in the selected subset of the plurality of UEs, the data downlink stream being transmitted in at least one beam from the base station directed as a function of the estimated angle of arrival of the UE transmitter signal at the spatially separated base station antennas corresponding to the first UE in the selected subset of the plurality of UEs, wherein the base station uses beamforming to direct a transmission of broadcast control information to UEs in the plurality of UEs, wherein the base station uses beamforming to limit the transmission of the data downlink stream in certain directions based on measurements of radio signals other than the UE transmitter signals of each UE in the plurality of UEs.

2. The method of claim 1, wherein the base station uses beamforming to direct: (1) the transmission of the generated scheduling instructions to each UE in the selected subset of the plurality of UEs; and (2) a transmission of control information for the independent downlink data stream to the first UE in the selected subset of the plurality of UEs.

3. The method of claim 1, wherein the base station uses beamforming to limit the transmission of the data downlink stream in certain directions based on measurements of the UE transmitter signals of each UE in the plurality of UEs.

4. The method of claim 1, wherein the base station uses beamforming to direct a transmission of multicast information based on measurements of UE transmitter signals received from UEs served by the base station.

5. The method of claim 1, wherein determining the differential angle of separation further comprises simultaneously receiving at least two of the UE transmitter signals on the at least two spatially separated base station antennas and on a same frequency.

6. The method of claim 1, wherein jointly decoding the UE transmitter signal transmitted by the UE and received on at least two spatially separated base station antennas further comprises jointly decoding multiple UE signals arriving simultaneously on the same frequency, based on phase differentiation of the signals at the physical layer.

7. The method of claim 1, wherein activating an independent data downlink stream to a first UE in the selected subset of the plurality of UEs further comprises scheduling to send data to more than one UE in the selected subset of the plurality of UEs in a same beam angle.

8. The method of claim 1, wherein jointly decoding a UE transmitter signal further comprises jointly decoding the separately demodulated components of the decoded UE signal data package based on a multiple-soft-input turbo decoder.

9. The method of claim 1, wherein jointly decoding a UE transmitter signal further comprises jointly decoding the separately demodulated components of the decoded UE signal data package based on a multiple-soft-input convolutional decoder.

10. A method to schedule User Equipment (UE) by a radio-frequency base station, the method comprising:

for each UE in a plurality of UEs:
configuring a base station to decode a UE signal data package based on separately demodulating and jointly decoding a UE transmitter signal transmitted by the UE and received on at least two spatially separated base station antennas; and, estimating an angle of arrival of the UE transmitter signal at the spatially separated base station antennas as a function of the UE signal data package, determining a differential angle of separation between at least two of the plurality of UEs based upon the respective estimated angles of arrival of the UE transmitter signals for each of the at least two of the plurality of UEs;

comparing the determined differential angle of separation to a predetermined minimum angle of separation determined as a function of the number of spatially separated base station antennas;

selecting a subset of the plurality of UEs for which the differential angle of separation exceeds the predetermined minimum angle of separation;

generating scheduling instructions configured to direct the selected subset of the plurality of UEs to simultaneously uplink to the base station on a same frequency;

transmitting the generated scheduling instructions from the base station to each UE in the selected subset of the plurality of UEs using a beam directed to each UE in the selected subset of the plurality of UEs; and, activating an independent data downlink stream to a first UE in the selected subset of the plurality of UEs, the data downlink stream being transmitted in at least one beam from the base station directed as a function of the estimated angle of arrival of the UE transmitter signal at the spatially separated base station antennas corresponding to the first UE in the selected subset of the plurality of UEs, wherein the base station uses beamforming to limit the transmission of the data downlink stream in certain directions based on measurements of radio signals other than the UE transmitter signals of each UE in the plurality of UEs.

11. The method of claim 10, wherein the base station uses beamforming to direct: (1) the transmission of the generated scheduling instructions to each UE in the selected subset of the plurality of UEs; and (2) a transmission of control information for the independent downlink data stream to the first UE in the selected subset of the plurality of UEs.

12. The method of claim 10, wherein the base station uses beamforming to limit the transmission of the data downlink stream in certain directions based on measurements of the UE transmitter signals of each UE in the plurality of UEs.

13. The method of claim 10, wherein determining the differential angle of separation further comprises simultaneously receiving at least two of the UE transmitter signals on the at least two spatially separated base station antennas and on a same frequency.

14. The method of claim 10, wherein activating an independent data downlink stream to a first UE in the selected subset of the plurality of UEs further comprises scheduling to send data to more than one UE in the selected subset of the plurality of UEs in a same beam angle.

15. A method to schedule User Equipment (UE) by a radio-frequency base station, the method comprising:
    for each UE in a plurality of UEs:
        configuring a base station to decode a UE signal data package based on separately demodulating and jointly decoding a UE transmitter signal transmitted by the UE and received on at least two spatially separated base station antennas; and,
        means for estimating an angle of arrival of the UE transmitter signal at the spatially separated base station antennas as a function of the UE signal data package,
    determining a differential angle of separation between at least two of the plurality of UEs based upon the respective estimated angles of arrival of the UE transmitter signals for each of the at least two of the plurality of UEs;
    comparing the determined differential angle of separation to a predetermined minimum angle of separation determined as a function of the number of spatially separated base station antennas;
    selecting a subset of the plurality of UEs for which the differential angle of separation exceeds the predetermined minimum angle of separation;
    generating scheduling instructions configured to direct the selected subset of the plurality of UEs to simultaneously uplink to the base station on a same frequency;
    transmitting the generated scheduling instructions from the base station to each UE in the selected subset of the plurality of UEs using a beam directed to each UE in the selected subset of the plurality of UEs; and,
    activating an independent data downlink stream to a first UE in the selected subset of the plurality of UEs, the data downlink stream being transmitted in at least one beam from the base station directed as a function of the estimated angle of arrival of the UE transmitter signal at the spatially separated base station antennas corresponding to the first UE in the selected subset of the plurality of UEs,
    wherein the base station uses beamforming to limit the transmission of the data downlink stream in certain directions based on measurements of radio signals other than the UE transmitter signals of each UE in the plurality of UEs.

16. The method of claim 15, wherein the base station uses beamforming to direct: (1) the transmission of the generated scheduling instructions to each UE in the selected subset of the plurality of UEs; and (2) a transmission of control information for the independent downlink data stream to the first UE in the selected subset of the plurality of UEs.

17. The method of claim 15, wherein the base station uses beamforming to limit the transmission of the data downlink stream in certain directions based on measurements of the UE transmitter signals of each UE in the plurality of UEs.

* * * * *